US012585375B2

(12) United States Patent      (10) Patent No.:    US 12,585,375 B2
Pal et al.                         (45) Date of Patent:    Mar. 24, 2026

(54) GENERATING SNAPPING GUIDE LINES FROM OBJECTS IN A DESIGNATED REGION

(71) Applicant: Adobe Inc., San Jose, CA (US)

(72) Inventors: Shivi Pal, Noida (IN); Praveen Kumar Dhanuka, Kolkata (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/887,322

(22) Filed: Aug. 12, 2022

(65)              Prior Publication Data

US 2024/0053872 A1      Feb. 15, 2024

(51) Int. Cl.
    *G06F 3/04842*        (2022.01)
    *G06F 3/0488*         (2022.01)
(52) U.S. Cl.
    CPC ........ *G06F 3/04842* (2013.01); *G06F 3/0488* (2013.01)
(58) Field of Classification Search
    CPC ................. G06F 3/048; G06F 3/04842; G06F 3/0488–04886; G06T 11/20–206
    See application file for complete search history.

(56)              References Cited

U.S. PATENT DOCUMENTS 6,480,813 B1 *  11/2002  Bloomquist ........ G06F 3/04842
                                                345/662
6,628,279 B1 *   9/2003  Schell ................. G06F 3/04845
                                                345/420

2003/0206169 A1 *  11/2003  Springer ............. G06F 3/04845
                                                      345/442
2004/0239691 A1 *  12/2004  Sprang .................... G06T 11/60
                                                      345/651
2009/0094560 A1 *   4/2009  Grossman ........... G06F 3/04883
                                                      715/863

(Continued)

OTHER PUBLICATIONS

LinkedIn Learning. AutoCAD Tutorial—Using object-snap tracking. YouTube. Feb. 8, 2017. <https://www.youtube.com/watch?v=fqneLAt6AWO> (Year: 2017).*

(Continued)

*Primary Examiner* — Liang Y Li
(74) *Attorney, Agent, or Firm* — Nicholson De Vos Webster & Elliott LLP

(57)              ABSTRACT

Embodiments are disclosed for generating snapping guide lines from objects in a selected region to an object or drawing tool by a digital design system. In particular, in one or more embodiments, the disclosed systems and methods comprise receiving a first selection of an object from a plurality of objects within a drawing displayed in a graphical user interface (GUI). The disclosed systems and methods further comprise receiving a second selection of a region of interest. The disclosed systems and methods further comprise identifying one or more objects in the region of interest. The disclosed systems and methods further comprise, in response to an input indicating a moving operation of the selected object, generating guide lines from objects in the region of interest to the selected object. The disclosed systems and methods further comprise performing the moving operation of the selected object based on alignment with the generated guide lines.

18 Claims, 10 Drawing Sheets

(56) References Cited

U.S. PATENT DOCUMENTS

| | | | | |
|---|---|---|---|---|
| 2014/0033132 A1* | 1/2014 | Jain | ..................... | G06F 3/04812 |
| | | | | 715/862 |
| 2017/0221236 A1* | 8/2017 | Dowd | ................. | G06F 3/04847 |
| 2019/0317980 A1* | 10/2019 | Dhanuka | ............... | G06F 40/109 |
| 2021/0303759 A1* | 9/2021 | Parekh | ................... | G06T 19/00 |

OTHER PUBLICATIONS

"Modeling Aids". Rhino 6 Documentation. Mcneel.com. Accessed Dec. 5, 2014, Oct. 23, 2021. <https://web.archive.org/web/20211023204547/http://docs.mcneel.com/rhino/6/help/en-us/options/modeling_aids.htm> (Year: 2021).*
Thomas B. Rhino Osnap. YouTube. Feb. 5, 2016. <https://www.youtube.com/watch?v=9_GVWkfNLOw> (Year: 2016).*
Cyber CAD solutions. What is Object Snap and How to use Object Snap in AutoCAD. YouTube. Nov. 2, 2017. <https://www.youtube.com/watch?v=OaaiKBemYJ8> (Year: 2017).*
Jackson, Theresa. Illustrator Smart Guides and Guides. Youtube.com. Feb. 15, 2020. <https://www.youtube.com/watch?v=vjX5S7t24Po> (Year: 2020).*

* cited by examiner

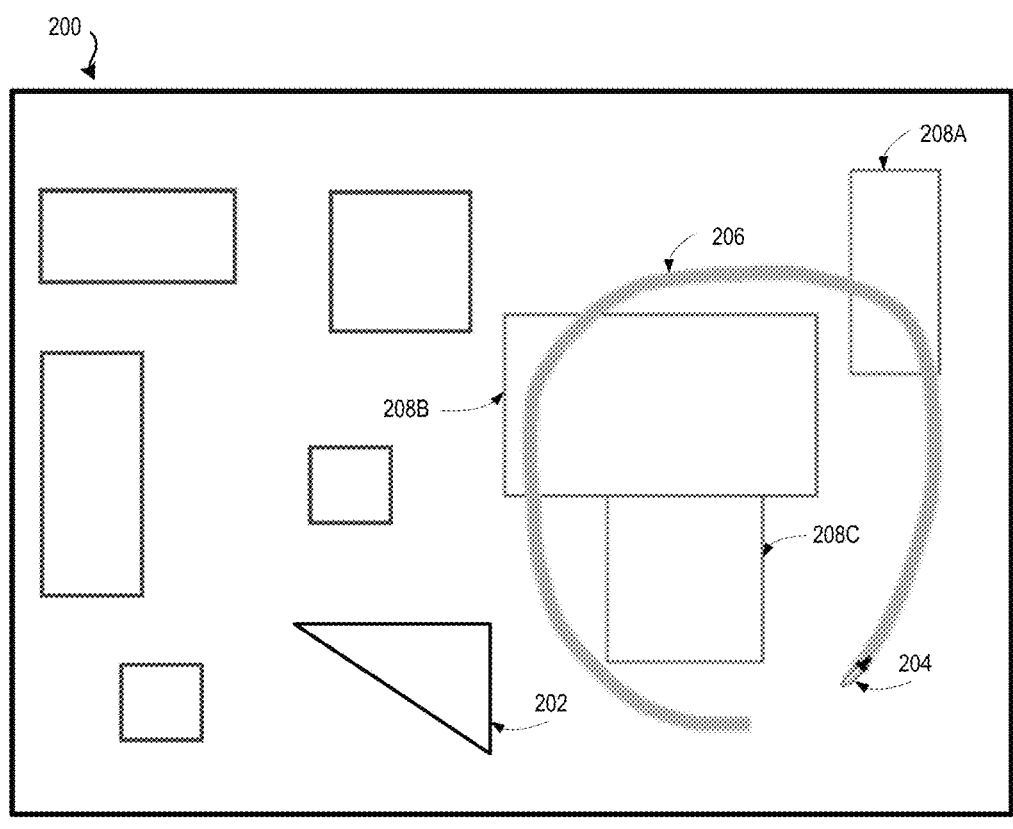
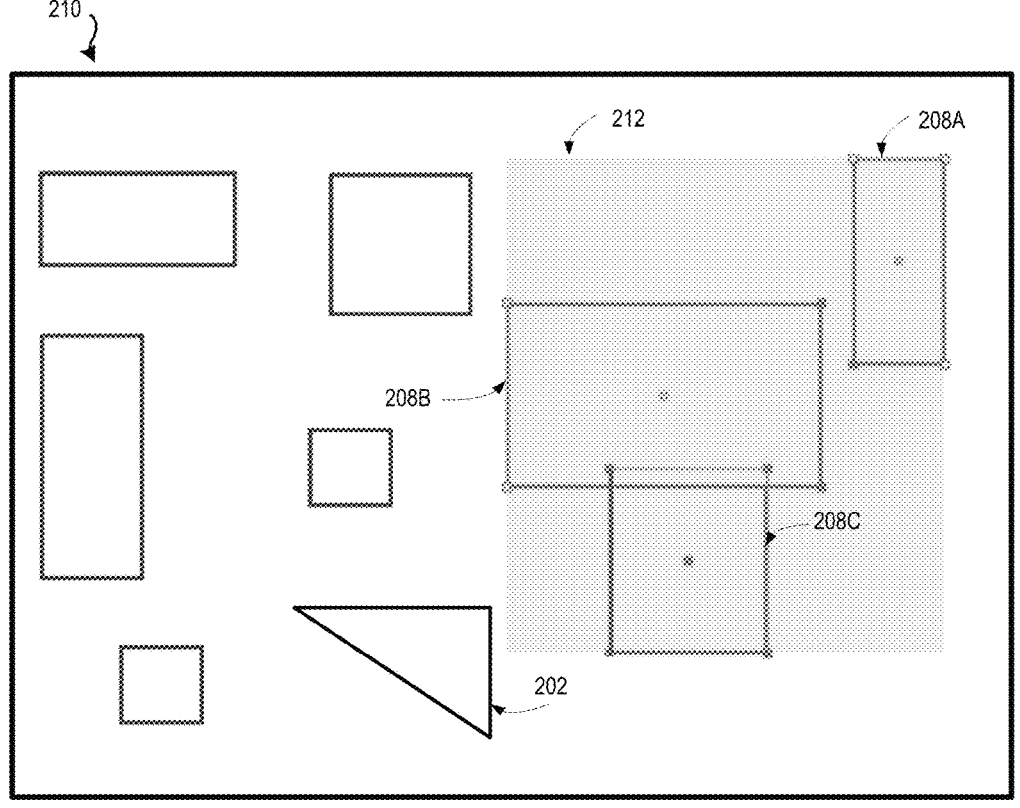
*FIG. 2*

500
510
504          506
502          508
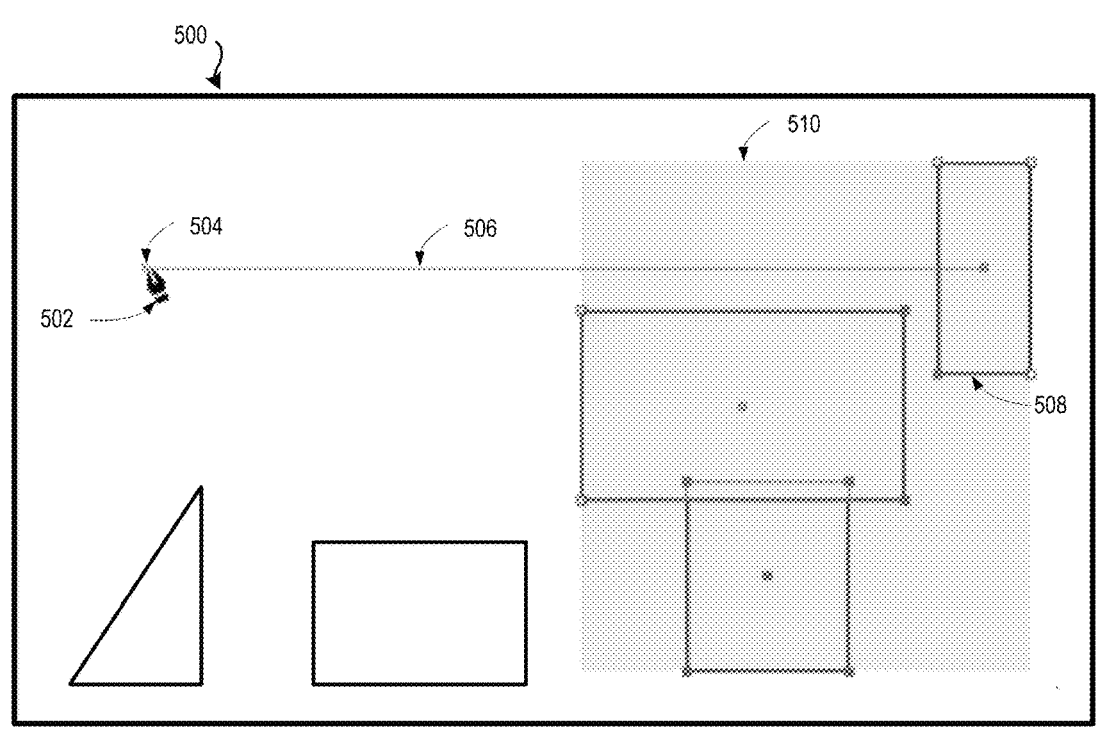
520
510
504
522          524
502          526
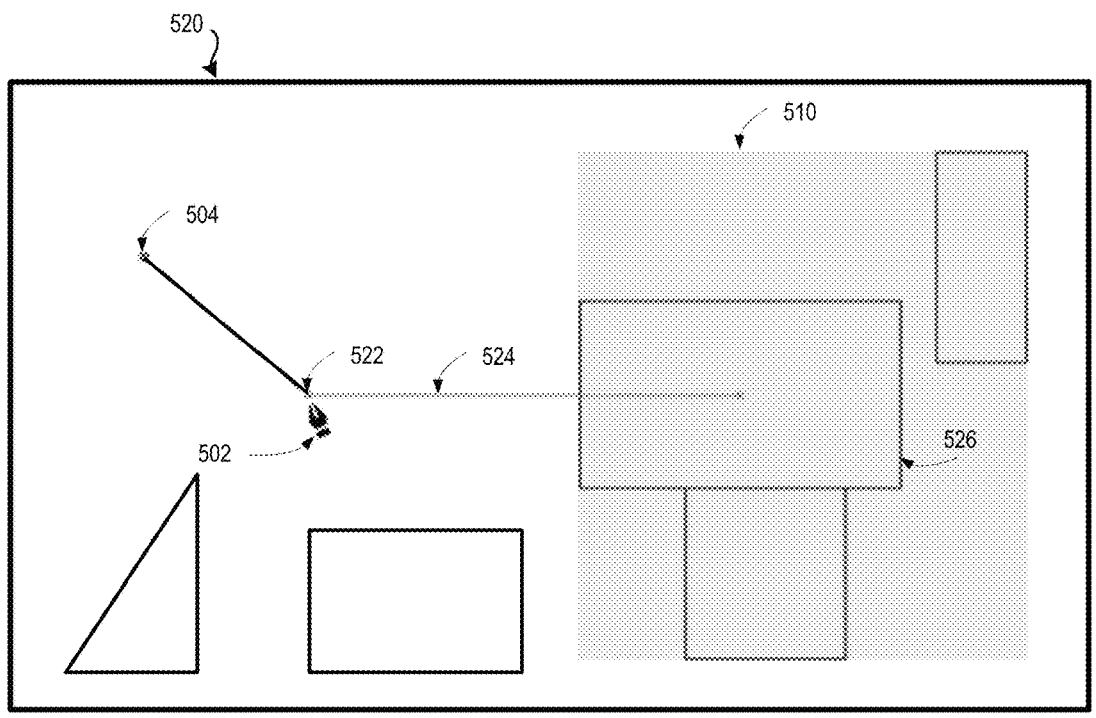
*FIG. 5*

700

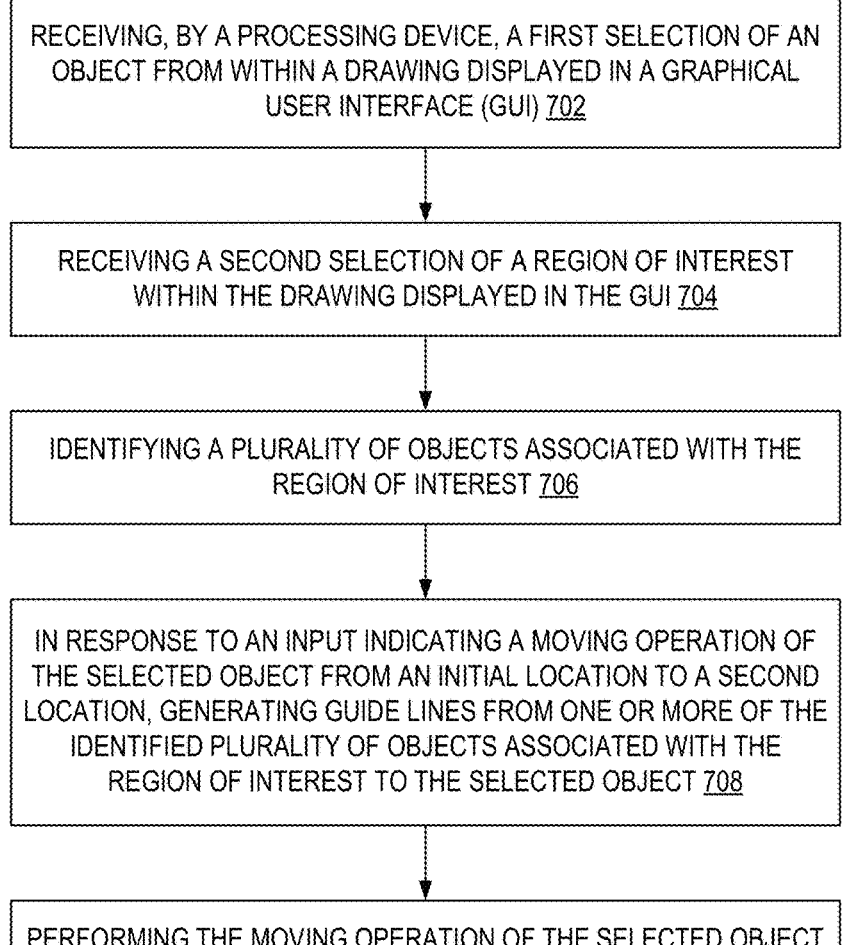

RECEIVING, BY A PROCESSING DEVICE, A FIRST SELECTION OF AN OBJECT FROM WITHIN A DRAWING DISPLAYED IN A GRAPHICAL USER INTERFACE (GUI) 702

RECEIVING A SECOND SELECTION OF A REGION OF INTEREST WITHIN THE DRAWING DISPLAYED IN THE GUI 704

IDENTIFYING A PLURALITY OF OBJECTS ASSOCIATED WITH THE REGION OF INTEREST 706

IN RESPONSE TO AN INPUT INDICATING A MOVING OPERATION OF THE SELECTED OBJECT FROM AN INITIAL LOCATION TO A SECOND LOCATION, GENERATING GUIDE LINES FROM ONE OR MORE OF THE IDENTIFIED PLURALITY OF OBJECTS ASSOCIATED WITH THE REGION OF INTEREST TO THE SELECTED OBJECT 708

PERFORMING THE MOVING OPERATION OF THE SELECTED OBJECT BASED ON ALIGNMENT WITH THE GENERATED GUIDE LINES 710

*FIG. 7*

800

RECEIVING, BY A PROCESSING DEVICE, A FIRST SELECTION OF A REGION OF INTEREST WITHIN A DRAWING DISPLAYED IN A GRAPHICAL USER INTERFACE (GUI), THE DRAWING INCLUDING A PLURALITY OF OBJECTS 802

IDENTIFYING A FIRST SET OF OBJECTS ASSOCIATED WITH THE REGION OF INTEREST 804

DISPLAYING A FIRST GUIDE LINE FROM A POINT OF AN OBJECT IN THE FIRST SET OF OBJECTS TO A FIRST LOCATION OF A CURSOR RESPONSIVE TO THE CURSOR ALIGNING WITH THE POINT 806

BLOCKING GUIDE LINES FROM A SECOND SET OF OBJECTS, THE SECOND SET OF OBJECTS LOCATED OUTSIDE THE REGION OF INTEREST 808

PERFORMING AN ACTION ON THE GUI FROM THE FIRST LOCATION TO A SECOND LOCATION BASED ON ALIGNMENTS WITH DISPLAYED GUIDE LINES 810

GENERATING SNAPPING GUIDE LINES FROM OBJECTS IN A DESIGNATED REGION

BACKGROUND

Computing devices (e.g., computers, tablets, smart phones) provide numerous ways for users to capture, create, view, edit, and otherwise interact with various types of digital content (e.g., drawings, digital images, etc.). For example, drawing, editing, and/or vector design applications allow users to modify or manipulate digital content using inputs provided on a graphical user interface (GUI). A common operation in these application is creating objects and/or moving objects around on the GUI. However, it can be difficult to align objects to produce an optimal layout of objects.

SUMMARY

Introduced here are techniques/technologies that allow a digital design system to generate snapping guide lines, or guide lines, between objects in a drawing or image. Specifically, snapping guide lines are generated from objects within a specified region of interest of the drawing or image to a cursor drawing a new object or to an existing object being moved (e.g., translated) from an initial location.

In particular, in one or more embodiments, a digital design system can receive an input from a user selecting an object in a drawing or image in a graphical user interface (GUI). The selection can be made using an input provided using an input device or via a touch gesture performed on a touch screen. The digital design system can then receive an input from a user selecting a particular region of interest in the drawing or image. Based on the selected region of interest, the digital design system can then identify a subset of objects of a plurality of objects in the drawing or image associated with the region of interest. Once the selected object and the region of interest are defined, the digital design system can then receive editing inputs from the user to perform various editing operations associated with the selected object. For example, the editing operations can include moving, resizing, and/or reshaping the selected object. As the selected object is moved around in the GUI, the digital design system generates snapping guide lines from objects in the selected region when the selected object is at locations that are in alignment with portions of the objects in the selected region. For example, when a vertex of the selected object is moved into alignment with a vertex of an object in the selected region, a snapping guide line is generated from the vertex of the object to at least the location of the vertex of the selected object. The user can then complete the editing operation to align the selected object with the object in the selected region based on the snapping guide line.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 2 illustrates graphical user interfaces (GUIs) of a digital design system in accordance with one or more embodiments;

FIG. 5 illustrates a GUI of a digital design system in accordance with one or more embodiments;

FIG. 7 illustrates a flowchart of a series of acts in a method of performing a moving operation of a selected object using snapping guide lines generated from a region of interest of a drawing in accordance with one or more embodiments;

FIG. 8 illustrates a flowchart of a series of acts in a method of performing a drawing operation using snapping guide lines generated from a region of interest of a drawing in accordance with one or more embodiments;

DETAILED DESCRIPTION

Figure 1:
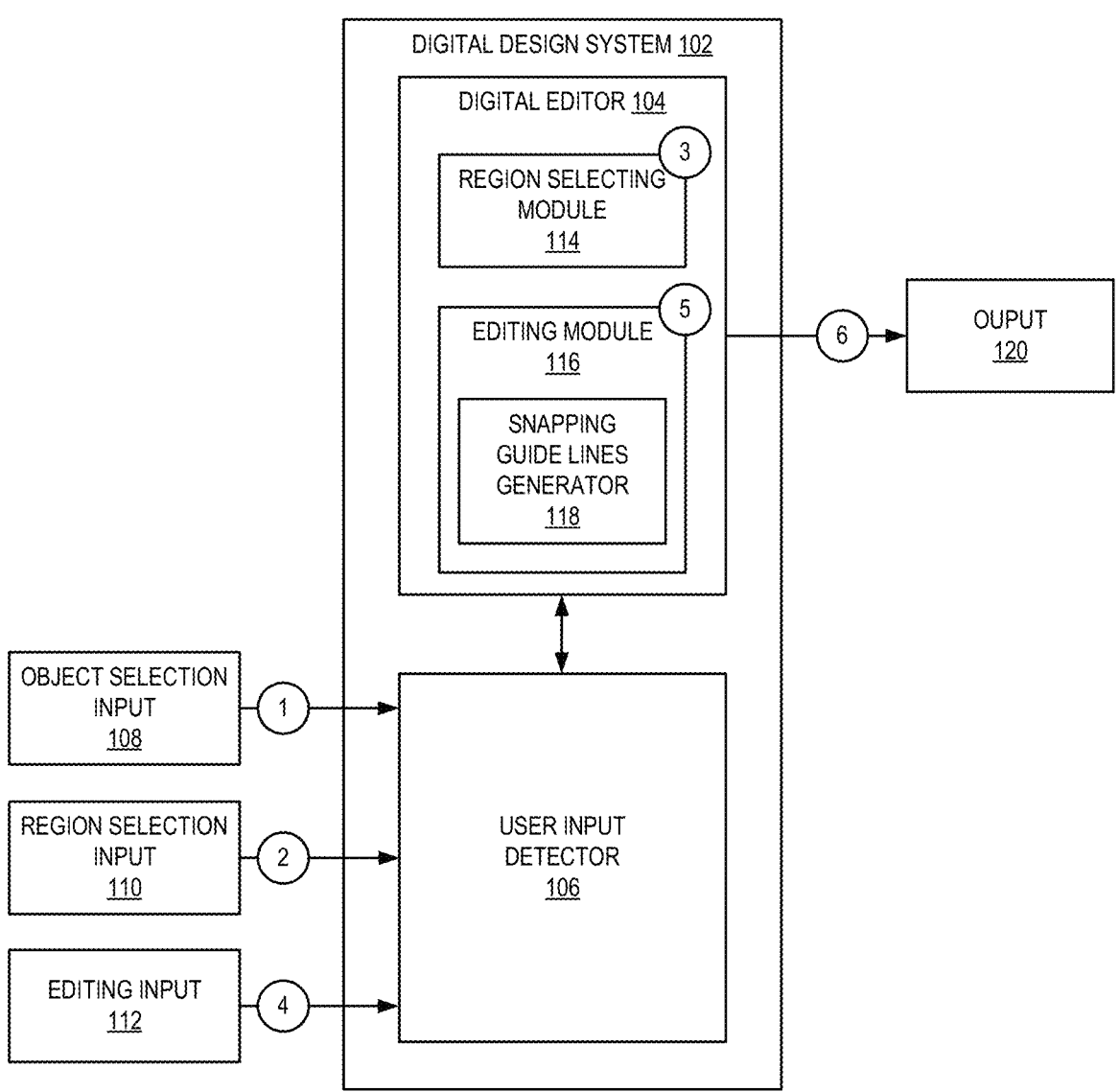
FIG. 1 illustrates a diagram of a process of performing editing operations in a digital design system using generated snapping guide lines in accordance with one or more embodiments.

One or more embodiments of the present disclosure include a digital design system that generates snapping guide lines from a objects within a defined region of interest of a drawing or image in response to editing operations performed in a graphical user interface (GUI). While existing solutions can align objects to smart guides, they have their limitations and disadvantages.

One existing solution to align objects is smart guides that allow users to quickly align elements or objects without having to resort to manual guides. As objects are moved around within a canvas in a drawing application, smart guides can be automatically generated to allow a user to snap objects, or portions of objects, to positions aligned with other objects. However, while smart guides allow a user to align graphical objects, as the number of graphical object increase in content-heavy files, they can become intrusive and unusable. For example, as a cursor or object is moved around a GUI with a large number of objects, the smart guides can produce significant visual noise generated as the result of smart guides being generated from all directions from all the objects on the canvas. Further, smart guides generated from unwanted objects can negatively impact the user focus and precision needed to align desired objects.

Another existing solution requires a user to hide any objects on the canvas that the user does not want smart guides generated with respect to, performing the editing operation, and then unhiding the hidden objects. Another existing solution is to zoom into the drawing or image such that smart guides are only generated from objects visually within the canvas. However, both of these solutions can negatively impact a user's workflow.

To address these issues, a digital design system (e.g., a drawing, editing, and/or vector design application) is configured to generate unidirectional snapping guide lines from objects in a user-specified region of a drawing or image to another object or to a cursor (or other similar tool or input device indicator). The drawing or image can include a plurality of objects and can either be retrieved from a memory or storage location and displayed in a graphical user interface (GUI). Alternatively, the drawing or image can be created using drawing tools within the digital design system. When the user wants to perform an editing operation (e.g., move an object, resize/reshape an object, draw a new object, etc.), the user can provide an object selection input from a user that includes a selection of an object in the drawing or image. The object selection input can be provided to the digital design system via an input provided using an input device (e.g., mouse, keyboard, etc.) or via a touch gesture performed on a touch screen. The digital design system can then receive a region selection input from a user selecting a particular region of interest in the drawing or image. The region selection input can include an input enabling a region snapping mode, such as a selection of button on an input device (e.g., a key on a keyboard or a mouse). The region selection input can further include an input from a user in the form of a gesture made on the GUI (e.g., an arc, a line, or a shape drawn on the GUI) enclosing, or partially enclosing the region of interest of the drawing or image. The gesture can be made using an input device or via a touch gesture. Based on the selected region of interest, the digital design system can then identify the objects in the drawing or image that are located within the region of interest, which can includes both objects entirely within the gesture or any objects bisected by the gesture (e.g., objects that the gesture intersects at any point). The digital design system can then visually highlight the region of interest, and any corresponding objects. For example, the region can be shaded a different color, the objects in the region of interest can be indicated with dashed lines, etc.

Once the selected object and the region of interest are defined, the user can provide editing inputs to the digital design system, where the editing inputs are to perform various editing operations with the selected object. Where the editing operation includes inputs to move the selected object, as the selected object is moved around in the GUI, the digital design system generates snapping guide lines from objects in the selected region when the selected object is at locations that are in alignment with portions of the objects in the selected region. In another example, when a vertex of the selected object is moved into alignment with a vertex of an object in the selected region, a snapping guide line is generated from the vertex of the object to at least the location of the vertex of the selected object. In another example, when resizing an object, a portion of the selected object (e.g., a single vertex, or multiple vertices forming a line segment) can be moved to reshape or resize the selected object. In such examples, as the portion of the selected object is moved, snapping guide lines can be generated as the portion of the selected object align with point of objects in the selected region. The user can then complete the editing operation to align the selected object with the object in the selected region based on the snapping guide line.

The embodiments described herein provide a significant improvement in usability and speed over existing system. By limiting the generation of snapping guide lines to objects only within a specified region, the digital design system ensures that an existing or new object can be easily aligned only to those objects specified by the user. In addition, the digital design system allows the user to move the selected object more easily and more quickly to a desired location by only generating unidirectional snapping guide lines (e.g., from a single direction between the selected object and the objects in the specified region). For example, the visual clutter on the canvas displaying the image or drawing is reduced by limiting snapping guide lines to/from only objects in the specified region, and further in a single direction between a selected object and the objects in the specified region. With less visual clutter, the user can perform moving and/or drawing operations more efficiently and quickly.

FIG. 1 illustrates a diagram of a process of performing editing operations in a digital design system using generated snapping guide lines in accordance with one or more embodiments. In one or more embodiments, the digital design system 102 can initially receive an input indicating a file or document that includes a drawing, where the drawing includes a plurality of objects. In other embodiments, the digital design system 102 can initially receive inputs from a user that causes the creation of a drawing that includes a plurality of objects (e.g., drawing inputs). In any such embodiments, the drawing can be displayed in a drawing, editing, and/or vector design application in a graphical interface (GUI). As shown in FIG. 1, the digital design system 102 receives an object selection input 108, as shown at numeral 1. For example, the digital design system 102 receives the object selection input 108 from a user via a computing device. In one or more embodiments, the object selection input 108 includes a selection of at least one object of the plurality of objects in the drawing for performing an editing operation.

As illustrated in FIG. 1, the digital design system 102 includes a user input detector 106 that receives the object selection input 108. The user input detector 106 detects, receives, and/or facilitates user inputs in any suitable manner. In some examples, the user input detector 106 detects one or more user interactions. As referred to herein, a "user interaction" means a single input, or combination of inputs, received from a user by way of one or more input devices, or via one or more touch gestures. A touch gesture user interaction can have variable duration and may take place relative to a display provided on a touch screen. In one or more embodiments, the user interactions detected by the user input detector 106 can include a user inputs detected from multiple input device, multiple touch gestures, or a combination thereof. The user input detector 106 passes the object selection input 108 to the digital editor 104, which can cause the selected object to be highlighted or otherwise visually distinguished from other objects in the drawing.

The user input detector 106 may additionally, or alternatively, receive data representative of a user interaction. For example, the user input detector 106 may receive one or more user configurable parameters from a user, one or more commands from the user, and/or any other suitable user input. In particular, the user input detector 106 can receive voice commands or otherwise sense, detect, or receive user input.

FIG. 2 illustrates graphical user interfaces (GUIs) of a digital design system in accordance with one or more embodiments. As shown in FIG. 2, a GUI 200 displays a drawing that includes a plurality of geometric objects. An object selection input (e.g., object selection input 108) can be received by the digital design system specifying an object 202 of the plurality of geometric objects that the user has selected to perform an editing operation on.

Returning to FIG. 1, the digital design system 102 then receives a region selection input 110 that indicates a region of interest within the image or drawing, as shown at numeral 2. In one or more embodiments, the region selection input 110 includes a selection of a region of the drawing. The user input detector 106 passes the region selection input 110 to a region selecting module 114 of the digital editor 104. In one or more embodiments, the region selecting module 114 determines the objects in the drawing associated with the region selection input 110, at numeral 3. For example, where the region selection input 110 is a gesture using a touch screen or input device over the drawing in the GUI, the region selecting module 114 can determine the objects in the drawing enclosed within and/or intersecting the gesture.

In one or more embodiments, the region selection input 110 can include both an action that causes a region snapping mode to be enabled and the input that specifies the region of interest. For example, the region snapping mode can be enabled by the selection of an interface element (e.g., button, icon, etc.) on the GUI or by the selection of an input element on an input device (e.g., a designated key on a keyboard or button on a mouse or other input device). In one or more embodiments, providing the region selection input 110 is non-destructive of a current action. For example, while moving the selected object, the user can decide to enable the region snapping mode by selecting the interface element or input element that enables the mode. The selection can then cause the selected object to be temporarily de-selected and a cursor can be modified to allow the user to specify the region of interest. Once the region of interest is specified and the user de-selects the interface element or input element that enables the mode, the cursor return to its previous location (e.g., before the region snapping mode was enabled) with the selected object still selected and the user can continue moving the selected object without having to re-select the selected object.

Returning to FIG. 2, a region selection input (e.g., region selection input 110) can be received using a cursor 204. For example, line 206 is an arc or circle drawn on the GUI representing a region selection input received by the digital design system (e.g., digital design system 102). The objects enclosed by, or intersecting, line 206 are object 208A, object 208B, and object 208C. GUI 210 displays the drawing after a region selecting module (e.g., region selecting module 114) of the digital design system has highlighted the selected region 212 that includes object 208A, object 208B, and object 208C. In some embodiments, the selected region 212 can be shaded a different color, the objects in the region of interest can be indicated with dashed lines, or other visual indications can be generated. In one or more embodiments, once the selected region has been specified, subsequent editing operations involving object 202 will result in snapping guide lines from the vertices and/or the center points of objects 208A-C and not from any other objects outsides of selected region 212.

Returning to FIG. 1, the digital design system 102 then receives an editing input 112, as shown at numeral 4. In one or more embodiments, the editing input 112 includes inputs to perform an editing operation of the selected object (e.g., the object selected using the object selection input 108). Examples of editing operations can include translating or moving the object, resizing the object, and/or modifying a shape of the object. The user input detector 106 passes the editing input 112 to the digital editor 104. In one or more embodiments, as the editing module 116 performs the editing operation on the selected object, the editing module 116 generates snapping guide lines, at numeral 5. The editing module 116 uses a snapping guide lines generator 118 to generate the snapping guide lines from the objects in the selected region to the selected object, while blocking or disabling the generation of snapping guide lines from objects not in the selected region. For example, as the user moves the selected object around the drawing, the snapping guide lines generator 118 generates snapping guide lines from the center point of an object in the selected region when a vertex or line segment of the selected object aligns with a ray from the center point of the object in the selected region. Similarly, the snapping guide lines generator 118 generates snapping guide lines from a vertex of an object in the selected region when a vertex or line segment of the selected object aligns with a ray from the vertex of the object in the selected region.

Figure 3:
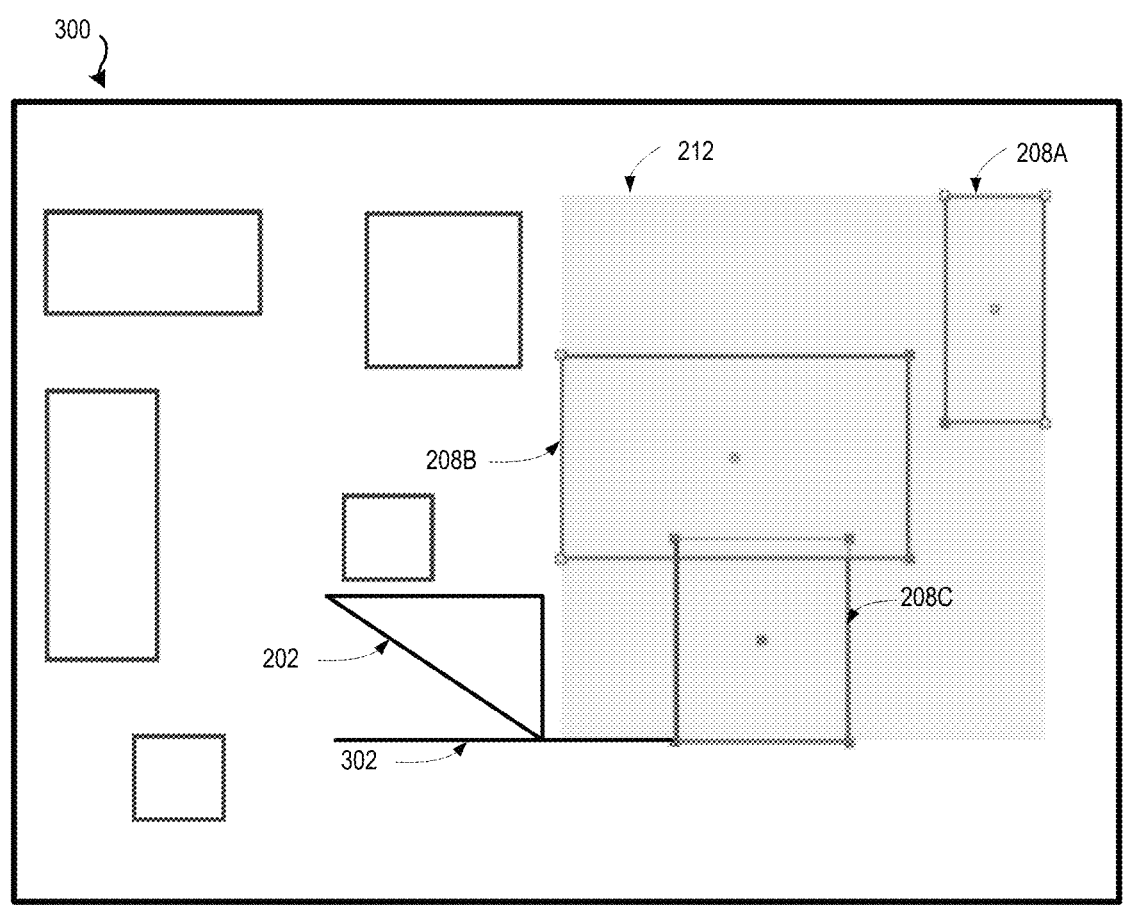
FIG. 3 illustrates a GUI of a digital design system in accordance with one or more embodiments.

FIG. 3 illustrates a GUI of a digital design system in accordance with one or more embodiments. As shown in FIG. 3, a GUI 300 displays a drawing that includes a plurality of geometric objects with a selected object 202 and a selected region 212 that includes objects 208A-C. An editing input (e.g., editing input 112) can be received by the digital design system specifying an editing operation that moves, or translates, selected object 202 from a first location to a second location. As the selected object 202 is moved around the GUI, snapping guide lines from objects 208A-C can be generated. For example, as the bottom vertex of selected object 202 is moved into alignment with a line segment joining the bottom two vertices of object 208C, snapping guide line 302 is generated as emanating from object 208C to indicate that the bottom vertex of selected object 202 is aligned with the bottom two vertices of object 208C. In one or more embodiments, the snapping guides lines are unidirectional, in that they are generated in a single direction between the selected object 202 and objects in the selected region 212. As the selected object 202 in FIG. 3 is to the side of the selected region 212, any snapping guide line from the objects 208A-C will be generated in the horizontal direction. If the editing input were to move the selected object 202 to locations above or below the selected region 212, any snapping guide lines from the objects 208A-C would be generated in the vertical direction.

Returning to FIG. 1, at numeral 6, the digital design system 102 can return an output 120 to the user. After the process described above in numerals 1-5, the output 120 can be sent to the user or computing device that initiated the editing process with the digital design system 102.

Figure 4:
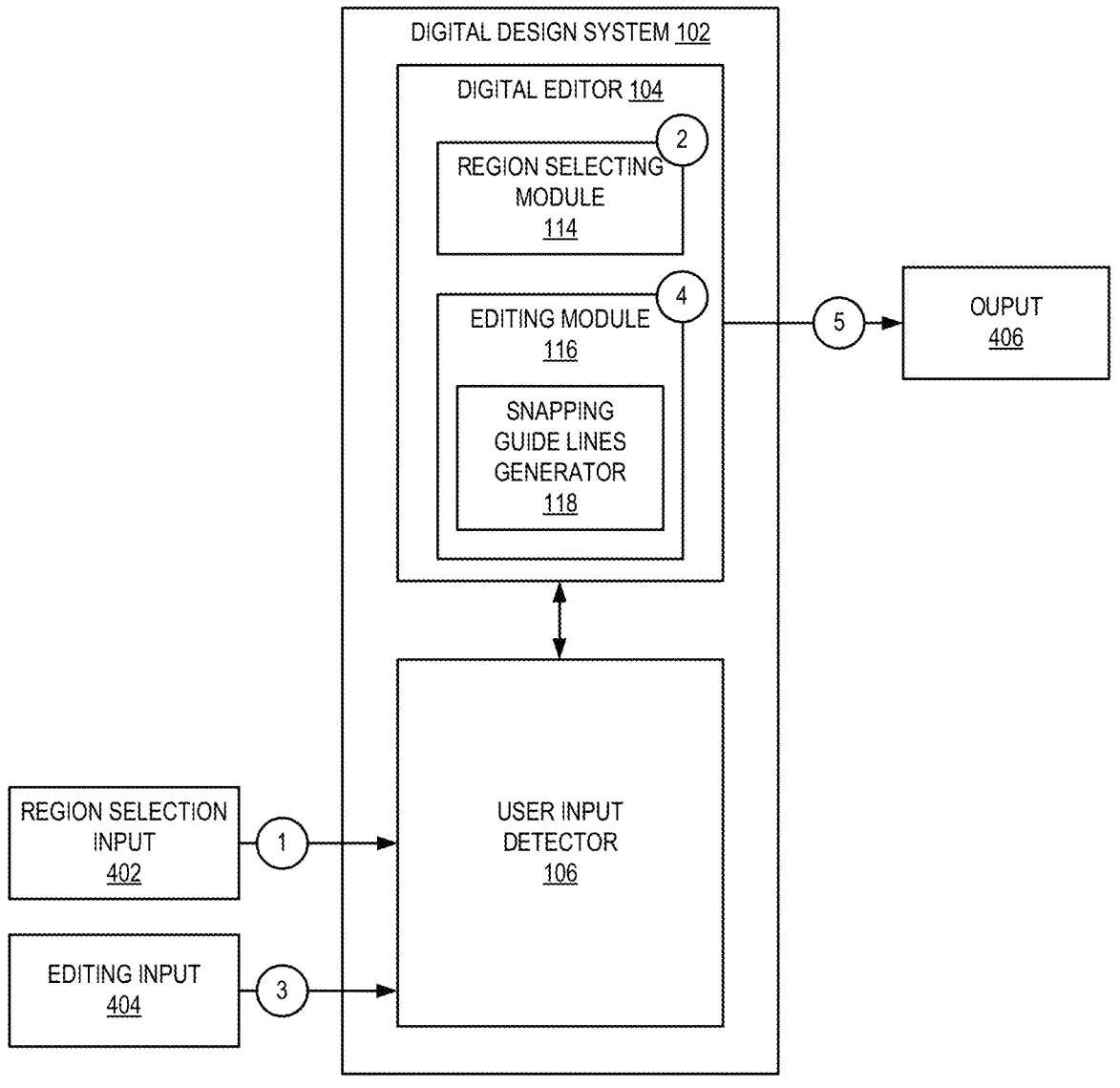
FIG. 4 illustrates a diagram of a process of performing editing operations in a digital design system using generated snapping guide lines in accordance with one or more embodiments.

FIG. 4 illustrates a diagram of a process of performing editing operations in a digital design system using generated snapping guide lines in accordance with one or more embodiments. In one or more embodiments, the digital design system 102 can initially receive an input indicating a file or document that includes a drawing, where the drawing includes a plurality of objects. In other embodiments, the digital design system 102 can initially receive inputs from a user that causes the creation of a drawing that includes a plurality of objects (e.g., drawing inputs). In any such embodiments, the drawing can be displayed in a drawing, editing, and/or vector design application in a graphical user interface (GUI). As shown in FIG. 1, the digital design system 102 receives a region selection input 402, as shown at numeral 1. For example, the digital design system 102 receives the region selection input 402 from a user via a computing device. In one or more embodiments, the region selection input 402 is received by a user input detector 106 and includes a selection of a region of the drawing. The user input detector 106 passes the region selection input 402 to a region selecting module 114 of the digital editor 104. In one or more embodiments, the region selecting module 114 determines the objects in the drawing associated with the region selection input 402, at numeral 2. For example, where the region selection input 110 is a gesture using a touch screen or input device over the drawing in the GUI, the region selecting module 114 can determine the objects in the drawing enclosed within and/or intersecting the gesture.

The digital design system 102 then receives an editing input 404, as shown at numeral 4. In one or more embodiments, the editing input 404 includes inputs to perform an editing operation in the drawing. Examples of editing operations in the drawing can include adding line segments, adding new objects, etc. The user input detector 106 passes the editing input 404 to the digital editor 104. In one or more embodiments, as the editing module 116 performs the editing operation in the drawing, the editing module 116 generates snapping guide lines, at numeral 4. In one or more embodiments, the editing module 116 uses a snapping guide lines generator 118 to generate the snapping guide lines from the objects in the selected region to a cursor associated with the editing input 404, while blocking or disabling the generation of snapping guide lines from objects not in the selected region. For example, as the user moves the cursor around the drawing, the snapping guide lines generator 118 generates snapping guide lines from the center point of an object in the selected region when the cursor aligns with a ray from the center point of the object in the selected region. Similarly, the snapping guide lines generator 118 generates snapping guide lines from a vertex of an object in the selected region when the cursor aligns with a ray from the vertex of the object in the selected region.

FIG. 5 illustrates a GUI of a digital design system in accordance with one or more embodiments. As shown in FIG. 5, a GUI 500 displays a drawing that includes a plurality of geometric objects with a selected region 510. In one or more embodiments, a cursor 502 associated with an input device or a touch gesture can be moved around the GUI. As the cursor 502 aligns with the center point of object 508 in selected region 510 (e.g., at point 504), snapping guide line 506 is generated as emanating from object 508 to indicate that the cursor 502 is aligned with the center point of object 508. GUI 520 illustrates the result of a drawing editing operation using the cursor 502. As the drawing editing operation is performed, snapping guide lines from vertices and/or center points of objects in selected region 510 are generated as the cursor aligns with the corresponding vertices and/or center points. For example, GUI 520 depicts an editing input resulting in the cursor 502 drawing a line segment from point 504 to point 522. When the cursor 502 is located at point 522, snapping guide line 524 is generated from the center point of object 526 in selected region 510 responsive to the cursor 502 aligning with the center point of object 526.

Returning to FIG. 4, the digital design system 102 can return an output 406 to the user, at numeral 5. After the process described above in numerals 1-4, the output 406 can be sent to the user or computing device that initiated the editing process with the digital design system 102.

Figure 6:
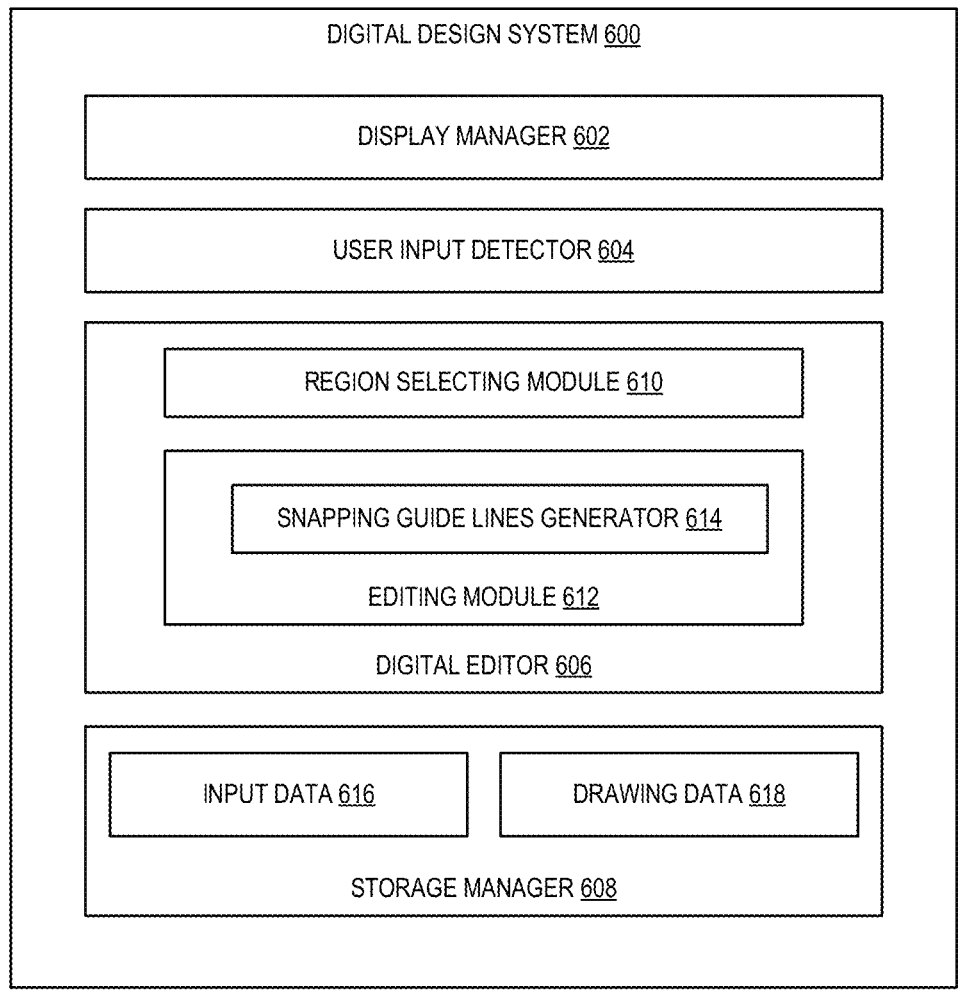
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a display manager 602, a user input detector 604, a digital editor 606, and a storage manager 608. As shown, the digital editor 606 includes a region selecting module 610 and an editing module 612, which includes a snapping guide lines generator 614. The storage manager 608 includes input data 616 and drawing data 618.

As illustrated in FIG. 6, the digital design system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the digital design system 600 also includes a user input detector 604. The user input detector 604 detects, receives, and/or facilitates user inputs in any suitable manner. In some examples, the user input detector 604 detects one or more user interactions. As referred to herein, a "user interaction" means a single input, or combination of inputs, received from a user by way of one or more input devices, or via one or more touch gestures. In some embodiments, user interaction can have variable duration and may take place relative to a display provided on a touch screen.

For example, the user input detector 604 can detect a touch gesture performed on a touch screen. In particular, the user input detector 604 can detect one or more touch gestures (e.g., tap gestures, swipe gestures, pinch gestures) provided by a user by way of the touch screen. In some embodiments, the user input detector 604 can detect touch gestures based on one point of contact or multiple points of contact on the touch screen. In some examples, the user input detector 604 can detect touch gestures in relation to and/or directed at one or more display elements (e.g., objects) displayed as part of a display presented on the touch screen.

The user input detector 604 may additionally, or alternatively, receive data representative of a user interaction. For example, the user input detector 604 may receive one or more user configurable parameters from a user, one or more commands from the user, and/or any other suitable user input. In particular, the user input detector 604 can receive voice commands or otherwise sense, detect, or receive user input.

As further illustrated in FIG. 6, the digital design system 600 also includes a digital editor 606. In one or more embodiments, the digital editor 606 provides a graphical user interface (GUI) and interface elements (e.g., buttons, selections, menus, etc.) to allow a user to perform editing functions on an image or drawing. The interface elements can include editing tools, including drawing tools, erasing tools, selection tools, etc. In one or more embodiments, the digital editor 606 utilizes a region selection input (e.g., from an input device and/or touch gestures) received by the user input detector 604 to cause a region selecting module 610 to identify a selected region of an image or drawing and objects in the selected region or intersecting the region selection input.

As further illustrated in FIG. 6, the digital editor 606 also includes an editing module 612 to perform editing operations based on the editing inputs received by the digital design system 600. Editing operations can include adding objects, removing objects, moving objects, etc. The editing module 612 further includes a snapping guide lines generator 614 configured to generate snapping guide lines from objects in a selected region to a cursor and/or a selected object. For example, as the user moves a selected object around the GUI, the snapping guide lines generator 614 generates snapping guide lines from the center point of an object in the selected region when a vertex or line segment of the selected object aligns with a ray from the center point of the object in the selected region. Similarly, the snapping guide lines generator 614 generates snapping guide lines from a vertex of an object in the selected region when a vertex or line segment of the selected object aligns with a ray from the vertex of the object in the selected region As further illustrated in FIG. 6, the storage manager 608 includes input data 616 and drawing data 618. In particular, the input data 616 may include data on the inputs received by the digital design system 600, including object selection inputs, region selection inputs, and editing inputs. In one or more embodiments, the drawing data 618 may include images and/or drawings created using the digital design system 600 that can be accessed by the digital design system 600 for display in a GUI to allow edition operations to be performed.

Each of the components 602-608 of the digital design system 600 and their corresponding elements (as shown in FIG. 6) may be in communication with one another using any suitable communication technologies. It will be recognized that although components 602-608 and their corresponding elements are shown to be separate in FIG. 6, any of components 602-608 and their corresponding elements may be combined into fewer components, such as into a single facility or module, divided into more components, or configured into different components as may serve a particular embodiment.

The components 602-608 and their corresponding elements can comprise software, hardware, or both. For example, the components 602-608 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-608 and their corresponding elements can comprise hardware, such as a special purpose processing device to perform a certain function or group of functions. Additionally, the components 602-608 and their corresponding elements can comprise a combination of computer-executable instructions and hardware.

Furthermore, the components 602-608 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-608 of the digital design system 600 may be implemented as a stand-alone application, such as a desktop or mobile application. Furthermore, the components

602-608 of the digital design system 600 may be implemented as one or more web-based applications hosted on a remote server. Alternatively, or additionally, the components of the digital design system 600 may be implemented in a suit of mobile device applications or "apps."

FIGS. 1-6, the corresponding text, and the examples, provide a number of different systems and devices that allow a digital design system to generating snapping guide lines from objects within a selected region. In addition to the foregoing, embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of performing a moving operation of a selected object using snapping guide lines generated from a region of interest of a drawing in accordance with one or more embodiments. In one or more embodiments, the method 700 is performed in a digital medium environment that includes the digital design system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving, by a processing device, a first selection of an object from within a drawing displayed in a graphical user interface (GUI). For example, the processing device can receive an object selection input from a user via a computing device, where the selected object is one of the plurality of objects in an image or drawing displayed by a drawing, editing, and/or vector design application in the GUI. In one or more embodiments, the object selection input includes a selection of at least one object of the plurality of objects in the image or drawing. The processing device can include a user input detector configured to receive the object selection input, in addition to other inputs. The user input detector detects, receives, and/or facilitates user inputs in any suitable manner.

As shown in FIG. 7, the method 700 also includes an act 704 of receiving a second selection of a region of interest within the drawing displayed in the GUI. In one or more embodiments, the processing device detects a gesture performed on the GUI, where the gesture encloses, or partially encloses, the region of interest within the GUI. In some embodiments, the processing device receives the gesture from an input device (e.g., a mouse). In other embodiments, the processing device receives the gesture as a touch gesture performed on a touch screen display, e.g., by a user directly or using a stylus.

As shown in FIG. 7, the method 700 also includes an act 706 of identifying a plurality of objects associated with the region of interest. In one or more embodiments, the processing device determines the plurality of objects associated with the region of interest by determining or identifying the objects that are located in the drawing that are enclosed within the region of interest. In some embodiments, the processing device includes any objects that intersect the received second selection as identified plurality of objects associated with the region of interest, even if a portion of the object is outside the received second selection. For example, if the gesture provided as the second selection bisects an object, the entire object will be included in the region of interest. After identifying the one or more objects associated with the region of interest, the processing device can generate an indication of the region of interest. For example, the processing device can generate a bounding box encompassing the plurality of objects associated with the region of interest, indicate the plurality of objects associated with the region of interest using dashed lines, highlight the plurality of objects associated with the region of interest, etc.

As shown in FIG. 7, the method 700 also includes an act 708 of, in response to an input indicating a moving operation of the selected object from an initial location to a second location, generating guide lines, or snapping guide lines, from one or more of the identified plurality of objects associated with the region of interest to the selected object. For example, the processing device can use a snapping guide lines generator to generate the guide lines from objects in the plurality of objects associated with the region of interest to the selected object, while blocking or disabling the generation of snapping guide lines from objects not in the region of interest. For example, as the user moves the selected object around the drawing, the snapping guide lines generator generates guide lines from the center point of an object in the region of interest when a vertex or line segment of the selected object aligns with a ray from the center point of the object region of interest. Similarly, the snapping guide lines generator generates guide lines from a vertex of an object in the region of interest when a vertex or line segment of the selected object aligns with a ray from the vertex of the object in the region of interest. In one or more embodiments, the snapping guides lines are unidirectional, in that they are generated in a single direction between the selected object and objects in the region of interest. For example, when the selected object is to the side of the region of interest, guide lines from the objects in the region of interest be generated in the horizontal direction. When the selected object is above or below the region of interest, guide lines from the objects would be generated in the vertical direction.

As shown in FIG. 7, the method 700 also includes an act 710 of performing the moving operation of the selected object based on alignment with the generated guide lines. For example, when the processing device receives an input indicating the completion of the moving operation (e.g., the user has completed a motion using a mouse, stylus, touch gesture, etc.), where the location of the completion of the moving operation is in alignment with a guide line, the selected object is repositioned at the new location indicated by the end of the moving operation. This process allows the selected object to be quickly aligned with objects in the region of interest without interrupting the workflow of the user.

FIG. 8 illustrates a flowchart of a series of acts in a method of performing a drawing operation using snapping guide lines generated from a region of interest of a drawing in accordance with one or more embodiments. In one or more embodiments, the method 800 is performed in a digital medium environment that includes the digital design system 600. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving, by a processing device, a first selection of a region of interest within a drawing displayed in a graphical user interface (GUI), the drawing including a plurality of objects. In one or more embodiments, the processing device detects a gesture performed on the GUI, where the gesture encloses, or partially encloses, the region of interest within the GUI. In some embodiments, the processing device receives the gesture from an input device (e.g., a mouse). In other embodiments, the processing device receives the gesture as a touch gesture performed on a touch screen display, e.g., by a user directly or using a stylus.

As shown in FIG. 8, the method 800 also includes an act 804 of identifying a first set of objects associated with the region of interest. In one or more embodiments, the processing device determines the first set of objects associated with the region of interest by determining or identifying the objects that are located in the drawing that are enclosed within the region of interest. In some embodiments, the processing device includes any objects that intersect the received second selection as an identified object associated with the region of interest, even if a portion of the object is outside the received second selection. For example, if the gesture provided as the second selection bisects an object, the entire object will be included in the region of interest. After identifying the one or more objects associated with the region of interest, the processing device can generate an indication of the region of interest. For example, the processing device can generate a bounding box encompassing the one or more objects associated with the region of interest, indicate the one or more objects associated with the region of interest using dashed lines, highlight the one or more objects associated with the region of interest, etc.

As shown in FIG. 8, the method 800 also includes an act 806 of displaying a first guide line from a point of an object in the first set of objects to a first location of a cursor responsive to the cursor aligning with the point. For example, as the cursor is moved around in the GUI, one or more guide lines are generated from objects in the first set of objects when the cursor aligns with center points or vertices of the objects. In one or more embodiments, the guides lines are unidirectional, in that they are generated in a single direction between the cursor and objects in the region of interest. For example, when the cursor is to the side of the region of interest, guide lines from the objects in the region of interest be generated in the horizontal direction. When the cursor is above or below the region of interest, guide lines from the objects would be generated in the vertical direction.

As shown in FIG. 8, the method 800 also includes an act 808 of blocking guide lines from a second set of objects, the second set of objects located outside the region of interest. By defining the region of interest with the received first selection, guide lines from any objects outside the region of interest can be temporarily disabled to provide a more efficient display of guide lines from objects within the region of interest.

As shown in FIG. 8, the method 800 also includes an act 810 of performing an action on the GUI from the first location to a second location based on alignments with displayed guide lines. In one or more embodiments, the performed action is based on an editing input, and can include a drawing operation. For example, the drawing operation can include the drawing of line segment from a first location aligned to a first point in the selected region to a second location aligned to second point in the second region. First, a cursor can be positioned to be in alignment with an object in the region of interest, resulting in a first guide line being generated from a first point in the selected region. The user can then continue to perform the drawing operation by extend a line segment from the first location to the second location in alignment with a second point in the selected region, resulting in a second guide line being generation from the second point in the selected region to the second location. In an example, where the line segment is a first line segment to draw an object with multiple line segments, as additional editing inputs are received to create the additional line segments, guide lines from vertices and/or center points of objects in the selected region are generated as the cursor aligns with the corresponding vertices and/or center points in a similar manner.

Figure 9:
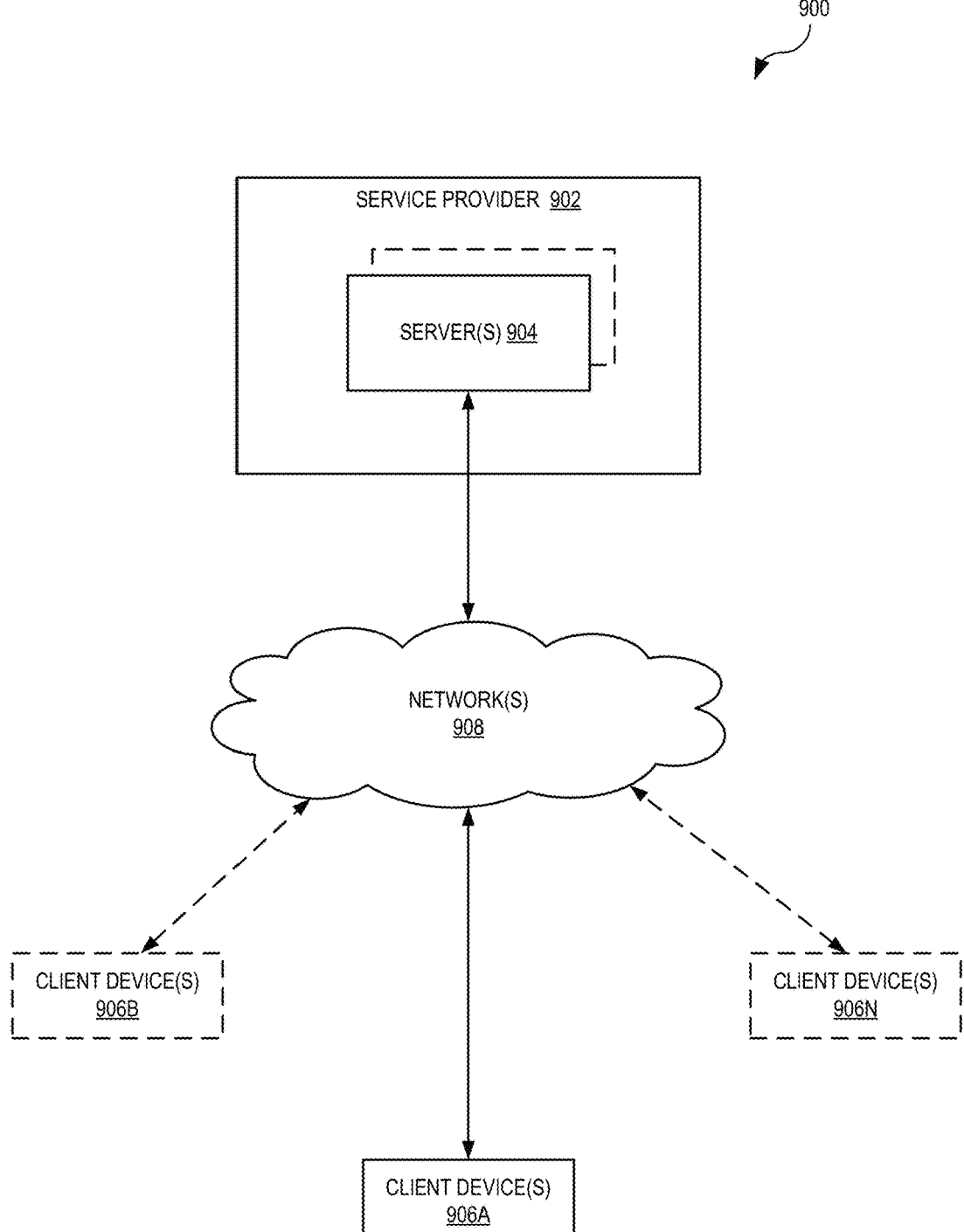
FIG. 9 illustrates a schematic diagram of an exemplary environment in which the digital design system can operate in accordance with one or more embodiments.

FIG. 9 illustrates a schematic diagram of an exemplary environment 900 in which the digital design system 600 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the digital design system 600. In particular, the digital design system 600 may be implemented in whole or in part on the client device 906A. Alternatively, in some embodiments, the environment 900 is implemented in a distributed architecture across multiple computing devices.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access the service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including input data 616 and drawing data 618 or other information. For example, a server 904 may receive data from a client device, such as the client device 906A, and send the data to another client device, such as the client device 906B and/or 906N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the digital design system 600. In particular, the digital design system 600 can comprise an application running on the one or more servers 904 or a portion of the digital design system 600 can be downloaded from the one or more servers 904. For example, the digital design system 600 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or web site hosted at the one or more servers 904.

Upon the client device 906A accessing a webpage or other web application hosted at the one or more servers 904, in one or more embodiments, the one or more servers 904 can provide a user of the client device 906A with an interface to provide inputs, including object selection inputs, region selection inputs, and/or editing inputs. Upon receiving the inputs, the one or more servers 904 can automatically perform the methods and processes described above to generate snapping guide lines between objects in a selected region and a cursor or object.

As just described, the digital design system 600 may be implemented in whole, or in part, by the individual elements 902-908 of the environment 900. It will be appreciated that although certain components of the digital design system 600 are described in the previous examples with regard to particular elements of the environment 900, various alternative implementations are possible. For instance, in one or more embodiments, the digital design system 600 is implemented on any of the client devices 906A-906N. Similarly, in one or more embodiments, the digital design system 600 may be implemented on the one or more servers 904. Moreover, different components and functions of the digital design system 600 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
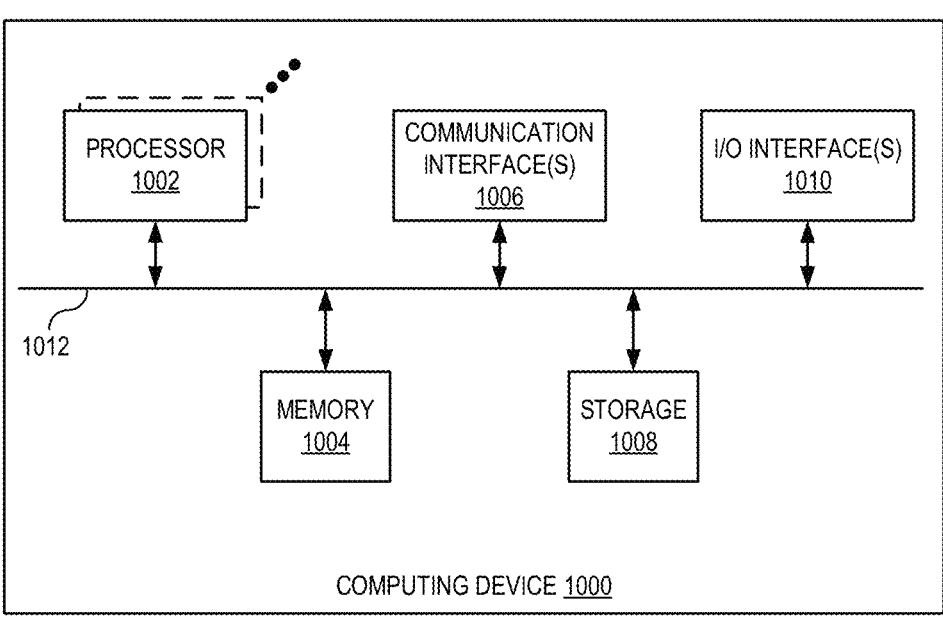
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the digital design system 600. As shown by FIG. 10, the computing device can comprise a processor 1002, memory 1004, one or more communication interfaces 1006, a storage device 1008, and one or more input or output ("I/O") devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more I/O devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

receiving, by a processing device, a first selection of an object from a plurality of objects within a drawing displayed in a graphical user interface (GUI);

receiving a second selection of a region of interest within the drawing displayed in the GUI, wherein the second selection occurs after the first selection and is non-destructive of the first selection, and wherein the second selection is a gesture performed on the GUI that encloses the region of interest;

identifying a first plurality of objects of the plurality of objects associated with the region of interest;

in response to an input on the GUI indicating a moving operation of the selected object from an initial location to a second location, automatically displaying guide lines from one or more of the identified first plurality of objects of the plurality of objects associated with the region of interest to the selected object when a portion of the selected object aligns with a portion of the one or more of the identified first plurality of objects of the plurality of objects;

disabling guide lines from being generated between the selected object and a second plurality of objects of the plurality of objects not associated with the region of interest; and performing the moving operation of the selected object based on alignment with the automatically displayed guide lines.

2. The method of claim 1, wherein receiving the second selection of the region of interest within the drawing displayed in the GUI comprises:

detecting a gesture performed on the GUI, the gesture enclosing the region of interest.

3. The method of claim 2, wherein receiving the second selection of the region of interest within the drawing displayed in the GUI comprises:

temporarily deselecting the selected object during performance of the gesture on the GUI; and automatically reselecting the selected object in response to determining a completion of the gesture on the GUI.

4. The method of claim 2, wherein identifying the first plurality of objects of the plurality of objects associated with the region of interest comprises:

determining the first plurality of objects of the plurality of objects enclosed within the region of interest or intersecting the gesture performed on the GUI.

5. The method of claim 4, further comprising:

generating a bounding box encompassing the first plurality of objects of the plurality of objects associated with the region of interest.

6. The method of claim 1, further comprising:

receiving a third selection, the third selection including a selection of an interface element on the GUI or a selection of an input element on an input device; and enabling a region snapping mode in the GUI in response to receiving the third selection.

7. A non-transitory computer-readable storage medium storing executable instructions, which when executed by a processing device, cause the processing device to perform operations comprising:

receiving, by a processing device, a first selection of an object from a plurality of objects within a drawing displayed in a graphical user interface (GUI);

receiving a second selection of a region of interest within the drawing displayed in the GUI, wherein the second selection occurs after the first selection and is non-destructive of the first selection, and wherein the second selection is a gesture performed on the GUI that encloses the region of interest;

identifying a first plurality of objects of the plurality of objects associated with the region of interest;

in response to an input on the GUI indicating a moving operation of the selected object from an initial location to a second location, automatically displaying guide lines from one or more of the identified first plurality of objects of the plurality of objects associated with the region of interest to the selected object when a portion of the selected object aligns with a portion of the one or more of the identified first plurality of objects of the plurality of objects;

disabling guide lines from being generated between the selected object and a second plurality of objects of the plurality of objects not associated with the region of interest; and performing the moving operation of the selected object based on alignment with the automatically displayed guide lines.

8. The non-transitory computer-readable storage medium of claim 7, wherein to receive the second selection of the region of interest within the drawing displayed in the GUI, the instructions further cause the processing device to perform operations comprising:

detecting a gesture performed on the GUI, the gesture enclosing the region of interest.

9. The non-transitory computer-readable storage medium of claim 8, wherein to receive the second selection of the region of interest within the drawing displayed in the GUI, the instructions further cause the processing device to perform operations comprising:

temporarily deselecting the selected object during performance of the gesture on the GUI; and automatically reselecting the selected object in response to determining a completion of the gesture on the GUI.

10. The non-transitory computer-readable storage medium of claim 8, wherein to identify the first plurality of objects of the plurality of objects associated with the region of interest, the instructions further cause the processing device to perform operations comprising:

determining the first plurality of objects of the plurality of objects enclosed within the region of interest or intersecting the gesture performed on the GUI.

11. The non-transitory computer-readable storage medium of claim 10, wherein the instructions further cause the processing device to perform operations comprising:

generating a bounding box encompassing the first plurality of objects of the plurality of objects associated with the region of interest.

12. The non-transitory computer-readable storage medium of claim 7, wherein the instructions further cause the processing device to perform operations comprising:

receiving a third selection, the third selection including a selection of an interface element on the GUI or a selection of an input element on an input device; and enabling a region snapping mode in the GUI in response to receiving the third selection.

13. A system comprising:

a memory component; and a processing device coupled to the memory component, the processing device to perform operations comprising:

receiving, by the processing device, a first selection of a region of interest within a drawing displayed in a graphical user interface (GUI) via a first gesture performed on the GUI that intersects or encloses the region of interest, the drawing including a plurality of objects;

identifying a first plurality of objects of the plurality of objects within an area defined by the region of interest;

receiving a second gesture performed on the GUI representing a movement of a cursor within the drawing, wherein the second gesture occurs after the first gesture and is non-destructive of the first selection;

automatically displaying a first guide line from a first point of an object in the first plurality of objects to a first location of the cursor responsive to the second gesture aligning with the first point and without an interaction by the second gesture with the object in the first plurality of objects;

disabling guide lines from objects located outside the region of interest; and performing an action on the GUI from the first location to a second location based on alignments with the automatically displayed guide lines, wherein a second guide line is displayed from a second point from the first plurality of objects to the second location responsive to the cursor aligning with the second point, and wherein the area defined by the region of interest is highlighted as the action on the GUI is performed.

14. The system of claim 13, wherein the processing device further performs operations comprising:

receiving a third selection, the third selection including a selection of an interface element on the GUI or a selection of an input element on an input device; and enabling a region snapping mode in the GUI in response to receiving the third selection.

15. The system of claim 13, wherein to receive the first selection of the region of interest, the processing device further performs operations comprising:

detecting the first gesture performed on the GUI, the first gesture enclosing the region of interest.

16. The system of claim 15, wherein to identify the first plurality of objects of the plurality of objects within the area defined by the region of interest, the processing device further performs operations comprising:

determining the first plurality of objects of the plurality of objects enclosed within the region of interest or intersecting the first gesture performed on the GUI.

17. The system of claim 13, wherein the processing device further performs operations comprising:

generating a bounding box encompassing the first plurality of objects of the plurality of objects associated with the region of interest.

18. The system of claim 13, wherein to perform the action on the GUI from the first location to the second location based on alignments with the automatically displayed guide lines, the processing device further performs operations comprising:

drawing a line segment from the first location aligned to the first guide line to the second location aligned to a second guide line.

\*    \*    \*    \*    \*